United States Patent [19]
Okamoto et al.

[11] Patent Number: 4,937,305
[45] Date of Patent: Jun. 26, 1990

[54] ELECTRICALLY INSULATING MATERIAL

[75] Inventors: Kohei Okamoto; Kenji Tsurushita, both of Tokuyama; Isao Fujii, Shinnanyo, all of Japan

[73] Assignee: Idemitsu Petrochemical Co., Ltd., Tokyo, Japan

[21] Appl. No.: 251,064

[22] Filed: Sep. 27, 1988

Related U.S. Application Data

[63] Continuation of Ser. No. 92,449, Sep. 3, 1987, abandoned.

[30] Foreign Application Priority Data

Sep. 19, 1986 [JP] Japan ................... 61-219210
Sep. 19, 1986 [JP] Japan ................... 61-219211

[51] Int. Cl.$^5$ .............................. C08G 18/69
[52] U.S. Cl. ........................ 528/65; 528/75; 528/85; 525/333.1; 525/374
[58] Field of Search ............... 528/75, 65, 85; 525/333.1, 374

[56] References Cited

U.S. PATENT DOCUMENTS

| | | | |
|---|---|---|---|
| 3,792,003 | 2/1974 | Duchesne | 528/75 |
| 4,020,125 | 4/1977 | Suzuki et al. | 528/75 |
| 4,521,581 | 6/1985 | Dominguez et al. | 528/75 |

FOREIGN PATENT DOCUMENTS

| | | |
|---|---|---|
| 1060293 | 5/1976 | Japan . |
| 0117522 | 7/1984 | Japan . |
| 0210928 | 11/1984 | Japan . |
| 1155419 | 7/1986 | Japan . |

Primary Examiner—John Kight, III
Assistant Examiner—Dennis R. Daley
Attorney, Agent, or Firm—Frishauf, Holtz, Goodman & Woodward

[57] ABSTRACT

The present invention is an electrically insulating material, comprising a cured product of a liquid polymer composition comprising a hydrogenated product of a liquid polyisoprene containing hydroxyl groups and a polyisocyanate compound, which is useful for electronic and electrical circuit boards; the molding materials for current transformers or transformers; molding materials for connecting portions such as cables, impregnation of casting materials for transformers or coils, etc.

8 Claims, No Drawings

ELECTRICALLY INSULATING MATERIAL

This application is a continuation, of application Ser. No. 07/092,449, filed Sept. 3, 1987, now abandoned.

BACKGROUND OF THE INVENTION

This invention relates to an electrically insulating material.

In the prior art, as an insulating material for a circuit board, for example, compositions comprising a liquid polybutadiene and a polyisocyanate compound have been known. Since these are liquid compositions, they have been used, for example, as the so called potting material which is casted on a print board, or as the so called dipping material in which a print board is dipped, and, in general, after completion of these treatments, curing is effected to form an insulating material. Whereas, the electrical insulating material comprising the above composition suffered from inconveniences such as inferior weathering resistance and thermal aging resistance.

Accordingly, in place of the above liquid polybutadiene, it has been proposed to use a hyrogenated product thereof. When such a hydrogenated product of the liquid polybutadiene is used, although weathering resistance of the insulating material obtained can be improved to some extent, the following problems ensue as the result of influence from the skeleton of the polybutadiene which is the starting material of the hydrogenated product. That is, when the polybutadiene has much 1,4-addition type skeleton, the hydrogenated product becomes solid to give no fluidity necessary as the potting material or the dipping material, while when it contains much 1,2-addition type skeleton, the average functionality number becomes smaller due to its polymerization process, and therefore there has been involved the problem that the cured product will flow when heated.

SUMMARY OF THE INVENTION

An object of the present invention is to provide an electrically insulating material having good fluidity as the potting material and the dipping material before curing, and yet having excellent thermal aging characteristic after curing.

A further object of the present invention is to provide an insulating material useful for an electronic and electric circuit boards; the molding materials for current transformers or voltage transformers; the molding materials for connecting portions such as cables, impregnation or casting materials for voltage transformers or coils, etc.

The electrically insulating material of the present invention is obtained by subjecting a liquid polymer composition, which comprises a hydrogenated product of a liquid polyisoprene containing hydroxyl group and a polyisocyanate compound, to curing treatment.

DETAILED DESCRIPTION OF THE INVENTION

As the liquid polyisoprene having hydroxyl group which is one essential component in the above liquid polymer composition, there may be employed a liquid polyisoprene having hydroxyl group in the molecule or at the terminal end of the molecule, having a number average molecular weight of 300 to 25,000, preferably 500 to 10,000. Here, the content of hydroxyl groups may be generally 0.1 to 10 meq/g, preferably 0.3 to 7 meq/g.

Such a liquid polyisoprene can be produced by, for example, subjecting isoprene to heating reaction in a liquid reaction medium in the presence of hydrogen peroxide.

Further, by hydrogenating the liquid polyisoprene thus obtained in the presence of a conventionally employed hydrogenation catalyst such as Ni, Co, Ru, Pt and Rh, the liquid polyisoprene having hydroxyl groups according to the present invention can be obtained.

Next, the polyisocyanate compound which is the second essential component is an organic compound having two or more isocyanate groups in one molecule, having isocyanate groups reactive with the hydroxyl group of the above hydrogenated product of a liquid polyisoprene containing hydroxyl groups. Examples of such polyisocyanate compound may include conventional aromatic, aliphatic and alicyclic polyisocyanates such as toluylene diisocyanate, hexamethylene diisocyanate, diphenylmethane diisocyanate (MDI), a liquid modified diphenylmethane diisocyanate, polymethylene polyphenylisocyanate, xylylene diisocyanate, cyclohexyl diisocyanate, cyclohexanephenylene diisocyante, naphthalene-1,5-diisocyanate, isopropylbenzene-2,4-diisocyanate, isophorone diisocyanate, an adduct of trimethylolpropane and toluylene diisocyanate, an adduct of trimethylolpropane and hexamethylene diisocyanate, and adduct of poly-propylene glycol and toluylene diisocyanate, and the like. Above all, MDI, a liquid modified diphenylmethane diisocyanate and toluylene diisocyanate are preferred.

The formulation ratio of the above-mentioned two components may generally be such that the ratio of the isocyanate groups (NCO) in the polyisocyanate compound relative to the hydroxyl groups (OH) in the hydrogenated product of the polyisoprene containing hydroxyl groups may be 0.2 to 25, preferably 0.5 to 15, particularly preferably 0.7 to 5, in terms of molar ratio.

Further, if necessary, a polyol compound or a polyamine compound may be added as a reinforcing agent. As the procedure for adding a polyol compound or a polyamine compound, it may be added simultaneously with formulation of the hydrogenated product of the polyisoprene containing hydroxyl groups and the polyisocyanate compound, or it may be also added after the hydrogenated product of the polyisoprene containing hydroxyl group and the polyisocyanate compound are formulated at a NCO/OH molar ratio of 1.5 or more to form a hydrogenated product of polyisoprene containing isocyanate group at the terminal end.

In any case, as useful polyol compounds, any of primary polyols, secondary polyols and tertiary polyols may be employed. Specific examples may be low molecular weight polyols containing at least one hydroxyl group bonded to a secondary carbon atom such as 1,2-propylene glycol, dipropylene glycol, 1,2-butane diol, 1,3-butane diol, 2,3-butane diol, 1,2-pentane diol, 2,3-pentane diol, 2,5-hexane diol, 2,4-hexane diol, 2-ethyl-1,3-hexane diol, cyclohexane diol, glycerine, N,N-bis(2-hydroxypropyl)aniline, N,N'-bishydroxyisopropyl-2-methylpiperazine, a propylene oxide adduct of bisphenol A, etc.

Further, as the polyol, there may also be used ethylene glycol, 1,3-propylene glycol, 1,4-butane diol, 1,5-pentane diol, 1,6-hexane diol, etc. containing no hydroxyl group bonded to a secondary carbon atom. As the polyol, a diol is usually used, but a triol such as trimethylol propane, etc. or tetraol may be also used, and its molecular weight is within the range of from 50 to 500.

On the other hand, as the polyamine compound, any of a diamine, a triamine or a tetramine may be used. Further, any of primary polyamines, secondary polyamines and tertiary polyamines can be used. As examples for the polyamine compounds, there may be mentioned aliphatic amines such as hexamethylene diamine; alicyclic amines such as 3,3'-dimethyl-4,4'-diaminodicyclohexylmethane; aromatic amines such as 4,4'-diaminodiphenyl; tetramines such as 2,4,6-tri(dimethylaminomethyl)phenol; and so on.

When these polyol compounds or polyamine compounds are to be formulated, their formulation ratios are not particularly limited, but usually 1 to 1000 parts by weight, preferably 3 to 200 parts by weight, particularly preferably 4 to 100 parts by weight, of a polyol compound or a polyamine compound are formulated per 100 parts by weight of the liquid hydrogenated polyisoprene containing hydroxyl group as described above.

Further, as other additives to be added if desired, there may be included fillers such as mica, graphite, vermiculite, calcium carbonate, hydrated alumina, barium sulfate, synthetic zeolite, slate powder, etc.

Further, it is possible to add plasticizers such as dioctyl phthalate as the viscosity controller, to add softening agents such as aromatic, naphthenic and paraffinic oils or to add tackiness imparting agents such as a alkyl phenol resin, a terpene resin, a terpene phenol resin, a xylene formaldehyde resin, rosin, a hydrogenated rosin, a coumarone resin, aliphatic and aromatic petroleum resins for controlling tacky force or adhesive force. Also, a curing promotor such as dibutyl tin dilaurate, stannous octoate, polyethylene diamine, etc. can be added. For imparting flame retardancy, flame retardants such as phosphorus compounds, halide compounds can be added, or a silicon compound can be added as the defoaming agent.

PREPARATION EXAMPLE 1

(Preparation of a hydrogenated product of a liquid polyisoprene having a hydroxyl group at the terminal end of the molecular chain)

A pressure reactor made of stainless steel having an inner volume of 1 liter was charged with 200 g of isoprene, 16 g of an aqueous 50 wt.% hydrogen peroxide and 100 g of sec-butyl alcohol as the solvent, and the reaction was carried out for 2 hours at a temperature of 120° C. and under the maximum pressure of 8 kg/cm² G. After completion of the reaction, the reaction mixture was withdrawn and shaken in a separation funnel with addition of 600 g of water, and then the mixture was left to stand for 3 hours. After separation of the organic layer, distillation was conducted for 2 hours under a pressure of 2 mmHg and at a temperature of 100° C. to remove the solvent, the monomer and low boiling components to obtain a liquid polyisoprene having a hydroxyl group at the terminal end. The yield was 68%. The liquid polyisoprene had a number average molecular weight of 2150, a hydroxyl group content of 0.96 meq/g and a viscosity of 56 poise at 30° C. Next, 100 g of the so obtained liquid polyisoprene having a hydroxyl group at the terminal end was placed in the reaction vessel as described above, and 100 g of cyclohexane as the solvent and 10 g of a catalyst of 5 wt.% Ru-C were charged therein, and hydrogen was introduced under a pressure of 50 kg/cm² G into the vessel.

The temperature was 140° C. and the reaction time was made 5 hours. After completion of the reaction, the reaction mixture was withdrawn and filtered through a membrane filter (0.45 μ) to remove the catalyst, followed by evaporation of the solvent for two hours under a pressure of 2 mmHg and at a temperature of 110° C. to obtain the desired hydrogenated product of the liquid polyisoprene having a hydroxyl group at the terminal end of the molecular chain. The hydrogenated product obtained had a number average molecular weight of 2210, a hydroxyl group content of 0.94 meq/g, an iodine value of 1 or less and a viscosity of 383 poise at 30° C.

PREPARATION EXAMPLE 2

(Preparation of a hydrogenated product of a liquid polyisoprene having a hydroxyl group at the terminal end of the molecular chain)

A liquid polyisoprene having a hydroxyl group at the terminal end of the molecular chain was obtained in the same manner as in the above Preparation example 1 except for changing the amount of the 50 wt.% aqueous hydrogen peroxide used to 50 g, the amount of sec-butyl alcohol used to 300 g, the reaction temperature to 115° C. and the reaction time to 2.5 hours. This product had a number average molecular weight of 1380, a hydroxyl group content of 1.39 meq/g and a viscosity of 23 poise at 30° C.

Subsequently, under the same conditions as in the above Preparation example 1, hydrogenation was conducted to obtain a hydrogenated product. This product had a number average molecular weight of 1450, a hydroxyl group content of 1.36 meq/g, an iodine value of 1 or less and a viscosity of 248 poise at 30° C.

PREPARATION EXAMPLE 3

(Preparation of a hydrogenated product of a 1,4-addition type liquid polybutadiene having a hydroxyl group at the terminal end of the molecular chain)

As the 1,4-addition type liquid polybutadiene having a hydroxyl group at the terminal end of the molecular chain, R-45HT produced by Idemitsu Arco K.K. (average molecular weight: 2800, OH content: 0.82 meq/g, viscosity at 30° C.: 50 poise, 1,4-addition type skelton: 80 mol%, 1,2-addition type skelton: 20 mol%) was used and hydrogenated to obtain a hydrogenated product. The hydrogenation conditions were set in the same manner as in the above Preparation example 1 except that the reaction time was made 4.5 hours and 500 ml of toluene was added after completion of the reaction. The hyrogenated product obtained had a number average molecular weight of 2920, an OH content of 0.80 meq/g, and it was a waxy solid.

PREPARATION EXAMPLE 4

(Preparation of a hydrogenated product of a 1,2-addition type liquid polybutadiene having a hydroxyl group internally in the molecular chain)

As the 1,2-addition type liquid polybutadiene having a hydroxyl group internally in the molecular chain, NISSO PB G-2000, produced by Nippon Soda K.K. (number average molecular weight: 2,000, OH content: 0.85 meq/g, viscosity at 30° C.: 1930 poise) was used and hydrogenated under entirely the same conditions as in the Preparation example 1 to obtain a hydrogenated product. The hydrogenated product had a number average molecular weight of 2,080, an OH content of 0.84 meq/g, and it was a highly viscous liquid with its viscosity at 30° C. being unmeasurable by use of a B type viscometer.

PREPARATION EXAMPLE 5

(Preparation of a hydrogenated product of a liquid polyisoprene having an isocyanate group at the terminal end of the molecular chain)

An amount of 50 g of the hyrogenated product obtained in the above Preparation example 1 was charged into a separable flask having an inner volume of 300 ml, and 15.8 g of toluylene diisocyanate was added thereto to carry out the reaction at 25° C. for 2 hours, followed by the reaction at 70° C. for 4 hours, to give a hydrogenated product of a liquid polyisoprene having an isocyanate group at the terminal end of the molecular chain. This product contained 8.93 wt.% of isocyanate groups (NCO groups) and had a viscosity of 573 poise at 30° C.

EXAMPLES 1-6, COMPARATIVE EXAMPLES 1-3

The components indicated in the Table were sampled in a vessel in the indicated amounts, and stirred at 25° C. for 2 minutes to prepare a liquid polymer composition. Subsequently, this composition was casted into a mold and press cured at 120° C. for 1 hour to obtain an electrically insulating material of the present invention.

For each electrically insulating material obtained, volume resistivity and elongation at 25° C. were measured. Also, physical properties after a thermal aging test were measured for examination of the thermal aging resistance, and the results are shown in the following Table.

liquid polymer composition comprising a hydrogenated product of a liquid polyisoprene containing an hydroxyl group and a compound selected from the group consisting of toluylene diisocyanate, hexamethylene diisocyanate, diphenylmethane diisocyanate (MDI), a liquid modified diphenylmethane diisocyanate, xylylene diisocyanate, cyclohexyl diisocyanate, cyclohexanephenylene diisocyanate, naphthalene-1,5-diisocyanate, isopropyl-benzene-2,4-diisocyanate, isophorone diisocyanate, and an adduct of polypropylene glycol and toluylene diisocyanate.

2. The electrically insulating material according to claim 1 wherein said liquid polyisoprene having hydroxyl group has a number average molecular weight of 300 to 25,000.

3. The electrically insulating material according to claim 2 wherein said liquid polyisoprene having hydroxyl group has a number average molecular weight of 500 to 10,000.

4. The electrically insulating material according to claim 1 wherein the hydroxyl group content in said liquid polyisoprene is in the range of 0.1 to 10 meq/g.

5. The electrically insulating material according to claim 4 wherein the hydroxyl group content in said liquid polyisoprene is in the range of 0.3 to 7 meq/g.

6. The electrically insulating material according to claim 1 wherein said diisocyanate compound is selected from the group consisting of a liquid modified diphenylmethane diiscyanate and toluylene diisocyanate.

7. The electrically insulating material according to claim 1 wherein the ratio of the isocyanate groups in the diisocyante compound relative to the hydroxyl groups is in the range of 0.2 to 25.

8. The electrically insulating material according to claim 7 wherein the ratio of the isocyanate groups in the diisocyante compound relative to the hydroxyl groups is in the range of 0.5 to 15.

|  |  | Example |  |  |  |  |  | Comparative example |  |  |
|---|---|---|---|---|---|---|---|---|---|---|
|  |  | 1 | 2 | 3 | 4 | 5 | 6 | 1 | 2 | 3 |
| components in liquid polymer composition (part by weight) | | | | | | | | | | |
| hydrogenated product of | Preparation example 1 | 100 | — | 100 | — | — | — | — | — | — |
| liquid polyisoprene having OH group | Preparation example 2 | — | 100 | — | — | — | — | — | — | — |
| hydrogenated product of | Preparation example 3 | — | — | — | — | — | — | 100 | — | — |
| liquid polybutadiene having OH group | Preparation example 4 | — | — | — | — | — | — | — | 100 | — |
| hydrogenated liquid polyisoprene having NCO group | Preparation example 5 | — | — | — | 100 | 100 | 100 | — | — | — |
| Liquid polybutadiene having OH group*1 | | — | — | — | — | — | — | — | — | 100 |
| polyisocyanate compound | diphenylmethane diisocyanate*2 | 14.3 | 20.7 | 28.6 | — | — | — | 12.2 | 12.8 | 12.2 |
| polyol compound | N,N-bis(2-hydroxypropyl) aniline | — | — | 8.5 | 21.0 | — | — | — | — | — |
|  | Preparation example 1 | — | — | — | — | — | 200 | — | — | — |
| polyamine compound | 3,3-dichloro-4,4'-diamino-diphenylmethane | — | — | — | — | 14.3 | — | — | — | — |
| curing catalyst | dibutyl tin dilaurate | 0.05 | 0.05 | 0.05 | 0.05 | 0.05 | 0.05 | 0.05 | 0.05 | 0.05 |
| electrically insulating material | | | | | | | | | | |
| volume resistivity (Ωcm) | | $2.1 \times 10^{16}$ | $2.4 \times 10^{16}$ | $2.7 \times 10^{16}$ | $2.9 \times 10^{16}$ | $3.6 \times 10^{16}$ | $1.7 \times 10^{16}$ | *4 | $1.9 \times 10^{16}$ | $5.6 \times 10^{15}$ |
| elongation (%) | | 250 | 245 | 320 | 345 | 375 | 485 | *4 | 475 | 155 |
| physical properties after thermal aging test*3 | intrinsic volume resistance (Ωcm) | $2.0 \times 10^{16}$ | $2.2 \times 10^{16}$ | $2.5 \times 10^{16}$ | $2.9 \times 10^{16}$ | $2.9 \times 10^{16}$ | $1.7 \times 10^{16}$ | *4 | *5 | *6 |
|  | elongation (%) | 240 | 225 | 295 | 330 | 370 | 465 | *4 | *5 | *6 |

*1manufactured by Idemitsu Arco Co., Ltd., a liquid polybutadiene having a hydroxyl group at the teminal end of the molecule, R-45HT (number average molecular weight: 2,800, OH content: 0.82 meq/g, viscosity at 30° C.: 50 poise)
*2manufactured by Nippon Polyurethane Co., Ltd., liquid modified, MILIONATE MTL, NCO content: 29.0 wt %
*3according to JIS K 6301, conditions: 130° C. × 72 hours, gear type aging test apparatus used
*4since the solid was insoluble at ordinary temperature, heating was conducted up to 50° C. However, the solid was still insluble and it was impossible to prepare a sheet of cured body.
*5physical properties unmeasurable due to the dripping of the test piece during the thermal aging test
*6physical properties unmeasureable due to the brittleness of the test piece during the thermal aging test

We claim:
1. An electrically insulating material for a circuit board, consisting essentially of a cured product of a

* * * * *